United States Patent
Wang et al.

(10) Patent No.: US 11,985,029 B2
(45) Date of Patent: May 14, 2024

(54) PICO-BASE STATION CONFIGURATION METHOD AND APPARATUS, STORAGE MEDIUM AND ELECTRONIC APPARATUS

(71) Applicants: SUNWAVE COMMUNICATIONS CO., LTD., Zhejiang (CN); BTI WIRELESS LTD, Hong Kong (CN); BRAVO TECH INC, La Mirada, CA (US)

(72) Inventors: Hai Wang, Zhejiang (CN); Gang Liang, Zhejiang (CN); Deming Wang, Zhejiang (CN); Yang Deng, Zhejiang (CN)

(73) Assignees: SUNWAVE COMMUNICATIONS CO., LTD., Zhejiang (CN); BTI WIRELESS LTD., Hong Kong (CN); BRAVO TECH INC, La Mirada, CA (US)

( * ) Notice: Subject to any disclaimer, the term of this patent is extended or adjusted under 35 U.S.C. 154(b) by 0 days.

(21) Appl. No.: 17/926,143

(22) PCT Filed: Apr. 29, 2021

(86) PCT No.: PCT/CN2021/090882
§ 371 (c)(1),
(2) Date: Nov. 18, 2022

(87) PCT Pub. No.: WO2022/033079
PCT Pub. Date: Feb. 17, 2022

(65) Prior Publication Data
US 2023/0198841 A1 Jun. 22, 2023

(30) Foreign Application Priority Data
Aug. 14, 2020 (CN) .......................... 202010820529.3

(51) Int. Cl.
*H04L 41/28* (2022.01)
*G06F 16/25* (2019.01)
*H04L 41/082* (2022.01)

(52) U.S. Cl.
CPC .......... *H04L 41/082* (2013.01); *G06F 16/252* (2019.01); *H04L 41/28* (2013.01)

(58) Field of Classification Search
CPC .............. G06G 16/252; H04L 61/4541; H04L 61/4511; H04L 61/4547; H04L 61/5007; H04L 61/5014
(Continued)

(56) References Cited

U.S. PATENT DOCUMENTS 10,395,316 B2 * 8/2019 Milne .................... G06Q 40/06
10,505,875 B1 * 12/2019 Jenks ...................... H04L 51/10
(Continued)

FOREIGN PATENT DOCUMENTS

AU  2010212512 B2 *  3/2016
CN  103686666 A  3/2014
(Continued)

OTHER PUBLICATIONS

The extended European search report of the corresponding EP patent application No. 21855135.6, mail date Sep. 20, 2023.

*Primary Examiner* — Khanh Q Dinh
(74) *Attorney, Agent, or Firm* — Samson G. Yu

(57) ABSTRACT

Embodiments of the disclosure provides a pico-base station configuration method and apparatus, a storage medium and an electronic apparatus, and relate to the technical field of wireless network pico-base station technology. The method includes: a request message for requesting data configuration of a pico-base station is acquired, wherein the request message includes parameters of a pico-base station configuration model object and a pico-base station configuration
(Continued)

model sub-object; the request message is verified; a thread corresponding to the request message in a sqlite database is called to execute warehousing processing on the parameters of the pico-base station configuration model object and the pico-base station configuration model sub-object, in a case where the request message passes the verification; and configuration validation processing is carried out on the pico-base station configuration model object and the pico-base station configuration model sub-object, in a case of determining that the warehousing processing is executed successfully; with adoption of the disclosure, the problems of low data transmission speed and low data updating efficiency can be solved, and the effect of improving the data transmission efficiency is achieved.

14 Claims, 4 Drawing Sheets

(58) Field of Classification Search
USPC .................................. 709/220, 224, 226, 228
See application file for complete search history.

(56) References Cited

U.S. PATENT DOCUMENTS

| | | | |
|---|---|---|---|
| 11,501,380 B1* | 11/2022 | Sharnoff | G06Q 40/08 |
| 11,687,487 B1* | 6/2023 | Abdul-Jawad | G06Q 30/0201 |
| | | | 707/704 |
| 11,757,914 B1* | 9/2023 | Jakobsson | H04L 51/212 |
| | | | 726/25 |
| 11,838,176 B1* | 12/2023 | Vanjare | H04L 63/101 |
| 2010/0261467 A1 | 10/2010 | Chou et al. | |
| 2011/0268044 A1 | 11/2011 | Yun et al. | |
| 2013/0064226 A1* | 3/2013 | Dinan | H04W 36/30 |
| | | | 370/332 |
| 2013/0343212 A1 | 12/2013 | Sedlar et al. | |
| 2015/0053757 A1* | 2/2015 | Williams | G06K 7/10009 |
| | | | 235/375 |
| 2015/0095648 A1* | 4/2015 | Nix | H04L 9/0894 |
| | | | 713/170 |
| 2016/0196131 A1* | 7/2016 | Searle | H04L 65/40 |
| | | | 717/173 |
| 2016/0294604 A1* | 10/2016 | Shakimov | H04L 41/0695 |
| 2016/0294605 A1* | 10/2016 | Searle | H04L 41/069 |
| 2016/0294614 A1* | 10/2016 | Searle | H04L 67/34 |
| 2018/0011990 A1* | 1/2018 | Moseley | G16C 20/20 |
| 2019/0097793 A1* | 3/2019 | Nix | H04L 63/0272 |
| 2020/0162451 A1* | 5/2020 | Alhawaj | G06F 21/45 |

FOREIGN PATENT DOCUMENTS

| | | | |
|---|---|---|---|
| CN | 104035839 A | * | 9/2014 |
| CN | 104572638 A | | 4/2015 |
| CN | 106954226 A | | 7/2017 |
| CN | 110071958 A | | 7/2019 |
| CN | 110213113 A | | 9/2019 |
| CN | 110890974 A | | 3/2020 |
| CN | 111241064 A | | 6/2020 |
| CN | 112235124 A | | 1/2021 |
| EP | 2523526 A1 | | 11/2012 |

* cited by examiner

PICO-BASE STATION CONFIGURATION METHOD AND APPARATUS, STORAGE MEDIUM AND ELECTRONIC APPARATUS

TECHNICAL FIELD

Embodiments of the disclosure relate to the field of communication, in particular to a pico-base station configuration method and apparatus, a storage medium and an electronic apparatus.

BACKGROUND

A pico-base station is a small wireless base station with single carrier transmission power of 100-500 MW and signal coverage radius of 20-50 m. At present, as main equipment for breadth extension and deep coverage of wireless coverage in wireless access network communication, the pico-base station is more prominent in position and effect in a wireless network.

At present, the pico-base station enters a rapid development stage, for pico-base station equipment, more and more related configuration data of storage equipment are needed, including equipment related alarm management, transmission links, system related configuration data and service related configuration data of sites, cells and the like, and meanwhile, the requirement on data transmission speed is higher and higher. While some conventional pico-base stations use xml files to store related configuration data, storage based on the file format is a saving for storage space of the pico-base station, but complex storage and reading operations occur, and particularly when real-time data updating is involved, the complex storage and reading operations will cause low efficiency of real-time data updating.

Because the pico-base station is not a modified version and simple miniaturization of a macro-base station, an application solution based on one set of modes of a macro-base station and an enterprise-level small-base station is not suitable for the pico-base station.

SUMMARY

The embodiments of the disclosure provide a pico-base station configuration method and apparatus, a storage medium and an electronic apparatus, for at least solving the problems of low data transmission speed and low data real-time updating efficiency in the relevant art.

According to an embodiment of the disclosure, a pico-base station configuration method is provided, which includes the following operations.

A request message for requesting data configuration of a pico-base station is acquired, wherein the request message includes parameters of a pico-base station configuration model object and a pico-base station configuration model sub-object to be connected with the pico-base station.

The request message is verified.

A thread corresponding to the request message in a sqlite database is called to execute warehousing processing on the parameters of the pico-base station configuration model object and the pico-base station configuration model sub-object, in a case where the request message passes the verification.

Configuration validation processing is carried out on the pico-base station configuration model object and the pico-base station configuration model sub-object, in a case of determining that the warehousing processing is executed successfully.

Optionally, the operation that the request message is verified includes the following operations.

The request message is parsed to determine a command word of the request message.

The command word is compared with an authentication command word loaded in a system starting process, and whether the command word is legal or not is determined based on a comparison result.

Optionally, the method further includes: the request message is parsed to determine a command code of the request message, and a pico-base station configuration model object and a pico-base station configuration model sub-object corresponding to the request message are determined according to the command code.

After the operation that whether the command word of the request message is legal or not is determined based on the comparison result, the method further includes: a configuration instruction is sent to the pico-base station configuration model object and the pico-base station configuration model sub-object based on the request message to indicate the pico-base station configuration model object and the pico-base station configuration model sub-object to carry out target configuration processing based on the configuration instruction, in a case where the command word of the request message is legal; and authentication failure information is fed back, in a case where the command word of the request message is not legal.

Optionally, the operation that the configuration instruction is sent to the pico-base station configuration model object and the pico-base station configuration model sub-object based on the request message to indicate the target configuration object to carry out target configuration processing based on the configuration instruction includes the following operations.

A configuration instruction is generated according to the pico-base station configuration model object and the pico-base station configuration model sub-object which are determined according to the command code and corresponding to the request message, and the configuration instruction is sent to the pico-base station configuration model object and the pico-base station configuration model sub-object; and the configuration instruction includes identification information corresponding to the pico-base station configuration model object and the pico-base station configuration model sub-object, and the identification information is configured for indicating the pico-base station configuration model object and the pico-base station configuration model sub-object.

Optionally, the operation that the request message is verified further includes the following operations.

The legality of the parameters of the pico-base station configuration model object and the pico-base station configuration model sub-object and the legality of the correlation between the pico-base station configuration model object and the pico-base station configuration model sub-object are verified, in a case where the command word is determined to be legal based on the comparison result; and the correlation between the pico-base station configuration model object and the pico-base station configuration model sub-object includes a reference relation between the pico-base station configuration model object and a referenced sub-object reference by the pico-base station configuration model object.

According to another embodiment of the disclosure, a pico-base station data configuration apparatus is provided, which includes a signal receiving and transmitting module, an authentication module, a sqlite database and a configuration model.

The signal receiving and transmitting module is configured to acquire a request message for requesting data configuration of a pico-base station, wherein the request message contains parameters of a pico-base station configuration model object and a pico-base station configuration model sub-object to be connected with the pico-base station.

The authentication module is configured to verify the request message.

The sqlite database is configured to, call a thread corresponding to the request message in the sqlite database to execute warehousing processing on the parameters of the pico-base station configuration model object and the pico-base station configuration model sub-object, in a case where the request message passes the verification.

The configuration model is configured to, carry out configuration validation processing on the pico-base station configuration model object and the pico-base station configuration model sub-object, in a case of determining that the warehousing processing is executed successfully.

Optionally, the authentication module includes a parsing unit and an authentication unit.

The parsing unit is configured to parse the request message and determine a command code and a command word of the request message.

The authentication unit is configured to compare the command word with an authentication command word loaded in a system starting process, and determine whether the command word is legal or not based on a comparison result.

Optionally, the apparatus further includes a configuration unit.

The configuration unit is configured to determine the pico-base station configuration model object and the pico-base station configuration model sub-object corresponding to the request message according to the command code; and the configuration module sends a configuration instruction to the pico-base station configuration model object and the pico-base station configuration model sub-object based on the request message to indicate the pico-base station configuration model object and the pico-base station configuration model sub-object to carry out target configuration processing based on the configuration instruction, in a case where the command word of the request message is legal, and feeds back authentication failure information in a case where the command word of the request message is not legal.

According to still another embodiment of the disclosure, a non-transitory computer-readable storage medium is provided. The storage medium stores a program. The program is configured to perform the steps in any one of the above-mentioned method embodiments when running by a processor.

According to yet another embodiment of the disclosure, an electronic apparatus is provided, which includes a memory and a processor. The memory stores a program. The processor is configured to implement the steps of any of the method embodiments described above when executed.

With adoption of the disclosure, the request message is processed by adopting the sqlite database, the sqlite database is small in occupied size and high in processing speed, so that the problems of low data transmission speed and low data real-time updating efficiency can be solved, and the effect of improving the data transmission efficiency is achieved.

DETAILED DESCRIPTION OF THE EMBODIMENTS

The embodiments of the disclosures will be described in detail below with reference to the drawings and in conjunction with the embodiments.

It is to be noted that the terms "first," "second," and the like in the specification, the claims and the drawings of the disclosure are used for distinguishing between similar objects and not necessarily for describing a particular sequence or sequential order.

Figure 1:
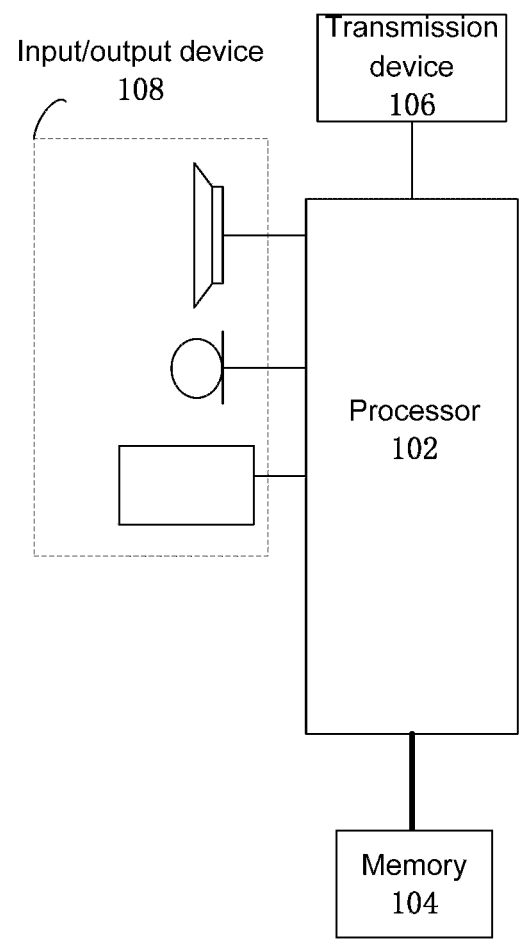
FIG. 1 is a block diagram of a hardware structure of a mobile terminal of a pico-base station configuration method according to an embodiment of the disclosure.

The method embodiment provided by the embodiments of the disclosure may be implemented in a mobile terminal, a computer terminal or a similar computing device. Taking operation on a mobile terminal as an example, FIG. 1 is a block diagram of a hardware structure of a mobile terminal of a pico-base station configuration method according to an embodiment of the disclosure. As shown in FIG. 1, the mobile terminal may include one or more (only one is shown in FIG. 1) processors 102 (the processor 102 may include but is not limited to a processing apparatus such as a Micro Controller Unit (MCU) or a Field Programmable Gate Array (FPGA)) and a memory 104 for storing data. The above mobile terminal may further include a transmission device 106 and an input/output device 108 for communication function. Those skilled in the art can understand that the structure shown in FIG. 1 is merely illustrative, and does not limit the structure of the above mobile terminal. For example, the mobile terminal may also include more or fewer components than shown in FIG. 1, or has a different configuration from that shown in FIG. 1.

The memory 104 may be configured to store a computer program, for example, a software program and module of application software, such as a computer program corresponding to a pico-base station configuration method in the embodiment of the disclosure, and the processor 102 executes various functional applications and data processing by running the computer program stored in the memory 104, that is, implements the above method. The memory 104 may include a high-speed random access memory and may also include a non-volatile memory such as one or more magnetic storage devices, a flash memory, or other non-volatile solid state memories. In some examples, the memory 104 may further include memories remotely located relative to the processor 102, which may be connected to the mobile terminal over a network. The examples of such networks include, but are not limited to, the Internet, the Intranet, local area networks, mobile communication networks, and combinations thereof.

The transmission device 106 is configured to receive or send data via a network. The above specific network example may include a wireless network provided by a communication provider of the mobile terminal. In one example, the transmission device 106 includes a Network Interface Controller (NIC) that may be connected to other network devices through a base station to communicate with the Internet. In one example, the transmission device 106 may be a Radio Frequency (RF) module for communicating with the Internet wirelessly.

Figure 2:
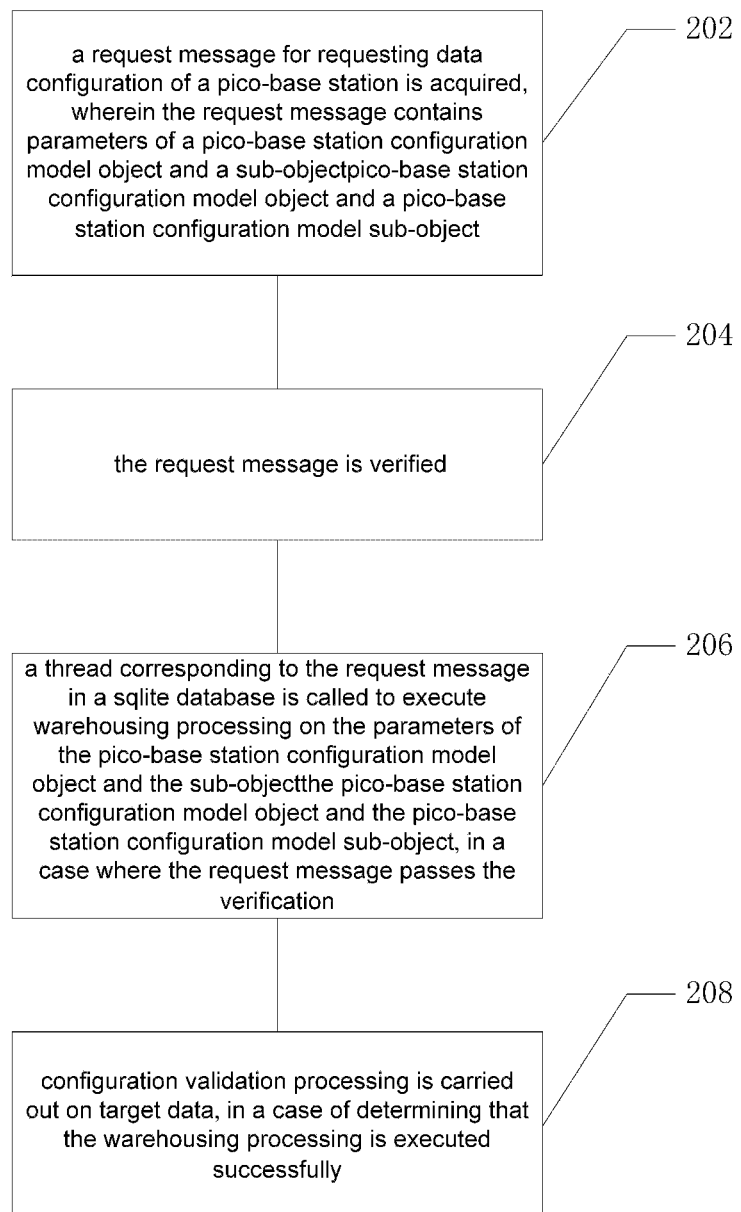
FIG. 2 is a flowchart of a pico-base station configuration method according to an embodiment of the disclosure.

In the embodiment, a pico-base station configuration method is provided, taking the addition of a pico-base station configuration object as an example, FIG. 2 is a flowchart of the embodiment of the disclosure, and as shown in FIG. 2, the flow contains the following steps.

In S202, a request message for requesting data configuration of a pico-base station is acquired, wherein the request message contains parameters of a pico-base station configuration model object and a pico-base station configuration model sub-object.

In an optional embodiment, the acquisition of the request message can be (but is not limited to) obtained by a user according to the service and parameters of the pico-base station and a target command for instructing the pico-base station configuration model object and the pico-base station configuration model sub-object by means of a keyboard or data transmission.

In S204, the request message is verified.

In an optional embodiment, the verification of the request message is to authenticate user authority and user operation according to the request message to authenticate the legality of user identity and the legality of user operation.

In S206, a thread corresponding to the request message in a sqlite database is called to execute warehousing processing on the parameters of the pico-base station configuration model object and the pico-base station configuration model sub-object, in a case where the request message passes the verification.

In an optional embodiment, warehousing processing on the parameters of the pico-base station configuration model object and the pico-base station configuration model sub-object refers to writing of the parameters of the pico-base station configuration model object and the pico-base station configuration model sub-object into a db file of the sqlite database.

The sqlite database module, as a configuration data storage center of a pico-base station product, is responsible for receiving a database operation request of a configuration module, involving basic operations such as insert, update, delete and select.

In an optional embodiment, the operation of the sqlite database is divided into two types including read operation and write operation, call requests of functions such as insert, update, delete and alter are classified as the write operation, call requests of select and functions displayed based on a query format are classified as the read operation, different operations and operations between different threads are executed in a serial communication mode, and therefore, synchronous processing of sqlite database operation among different processes is completed.

For example, other business modules send sqlite request messages to a read thread or a write thread of the sqlite database according to the operation request. After the sqlite database receives the read or write request message, the sqlite database adds the request message for calling the read thread or the write thread into a sqlite operation queue, and any sqlite database operation is carried out based on atomization.

In an optional embodiment, for configuration operation between a WebLMT and a base station webmaster, consistency of a configuration object and configuration data needs to be achieved through configuration authority control, the base station webmaster has the configuration authority of a super user, during base station webmaster configuration, the configuration authority of a configuration network element is obtained in advance, therefore, the user cannot temporarily perform configuration through a base station near-end maintenance station, and can perform configuration through the base station near-end maintenance station only after the base station webmaster completes configuration and releases the configuration authority in time.

After completing the warehousing operation, the sqlite database sends a feedback message.

In S208, configuration validation processing is carried out on target data, in a case of determining that the warehousing processing is executed successfully.

In an optional embodiment, under the condition that all thread operations corresponding to the request message are completed, it is determined that parameter warehousing of the pico-base station configuration model object and the pico-base station configuration model sub-object is successful according to the feedback message, and then interface adaptation is carried out on the pico-base station configuration model object and the pico-base station configuration model sub-object according to the message fed back by the database, a configuration success message is fed back after the adaption is successful, and successful adaption is prompted.

For example, when an operation of modifying an attribute of a transmission port is executed, the configuration data is firstly subjected to correctness verification, verification is completed, then the configuration data is stored in a database and then sent to a transmission module, the modified attribute is validated into a single board or equipment, and subsequently the port works according to the validated attribute.

Through the steps, the sqlite database is used as the database for data configuration, so that the requirements of the pico-base station on small size and high data updating efficiency of the database can be met, the problems of low data transmission speed and low data real-time updating efficiency caused by applying a traditional database to the pico-base station are solved, and the data transmission efficiency is improved.

An execution subject of the above-described steps may be a base station, a terminal, or the like, but is not limited thereto.

In an optional embodiment, the operation that the request message is verified includes the following operations.

In S2042, the request message is parsed to determine a command word of the request message.

In an optional embodiment, after the request message is received, the request message is parsed, then a command word in the request message is extracted and determined according to the parsing result, and the command word is configured or judging whether the request message is legal or not.

In S2046, the command word of the request message is compared with an authentication command word loaded in a system starting process, and whether the command word of the request message is legal or not is determined.

In an optional embodiment, when the command word of the request message is the same as the authentication command word loaded in a system starting process, it is determined that the command word of the request message is legal, thus the request message is determined to be legal, and otherwise, it is not legal; and the authentication command word is a command word loaded in a system starting process by a service module for executing verification of the request message.

In an optional embodiment, the method further includes the following operations.

In S2044, the request message is parsed, a command code of the request message is determined, and a pico-base station configuration model object and a pico-base station configuration model sub-object corresponding to the request message are determined according to the command code.

In an optional embodiment, the process of determining the pico-base station configuration model object and the pico-base station configuration model sub-object corresponding to the request message is the process of searching the target configuration object corresponding to the command code according to the command code, i.e., the command code of the target configuration object is sequentially compared with the command code of the request message, when the pico-base station configuration model object and the pico-base station configuration model sub-object are consistent with the command code of the request message or the corresponding requirements are met, the pico-base station configuration model object and the pico-base station configuration model sub-object are determined as the pico-base station configuration model object and the pico-base station configuration model sub-object corresponding to the request message.

After whether the command word of the request message is legal or not is determined based on the comparison result, the method further includes the following operations.

In S2048, a configuration instruction is sent to the pico-base station configuration model object and the pico-base station configuration model sub-object based on the request message to indicate the pico-base station configuration model object and the pico-base station configuration model sub-object to carry out target configuration processing based on the configuration instruction, in a case where the command word of the request message is legal; or authentication failure information is fed back, in a case where the command word of the request message is not legal.

In an optional embodiment, under the condition that the command word of the request message is legal, according to the parameters of the pico-base station configuration model object and the pico-base station configuration model sub-object in the request message, the legality of the parameters of the pico-base station configuration model object and the pico-base station configuration model sub-object and the legality of the correlation between the pico-base station configuration model object and the pico-base station configuration model sub-object are verified, and after the verification is successful, the parameters of the pico-base station configuration model object and the pico-base station configuration model sub-object are converted into statements with corresponding formats which are sent to the sqlite database.

For example, when the input is an MML command, the configuration module calls a MML parser to obtain a command word of the MML command, a configuration parameter name and a corresponding parameter value, and then completes the verification of the legality of the target configuration object according to the obtained command word, the configuration parameter name and the corresponding parameter value; after verification is successful, the configuration module converts the verified configuration parameter name and corresponding parameter value into SQL statements, and sends the converted SQL statements to the sqlite database; wherein the configuration parameters represent configuration parameters of the configuration model object and the sub-object of the pico-base station.

For example, a configuration command MOD BTS, represents a function of "modifying base station" attribute, wherein "BTS" represents a configuration model object of the pico-base station, and its configuration parameters include fields such as "base station name" and the like.

When the command word of the request message is illegal or the pico-base station configuration model object and the pico-base station configuration model sub-object corresponding to the command code are not searched, authentication failure is determined, then an authentication failure signal is sent, and error information prompt is carried out according to the authentication failure signal.

In optional embodiment, error information may (but is not limited to) be prompt for authentication failure, or prompt for configuration command or parameter error entered by a user.

The prompt mode of the error information can be display through images, or voice broadcast through voice equipment, or combination of image display and voice broadcast.

Furthermore, the operation that the configuration instruction is sent to the pico-base station configuration model object and the pico-base station configuration model sub-object based on the request message to indicate the pico-base station configuration model object and the pico-base station configuration model sub-object to carry out target configuration processing based on the configuration instruction includes the following operations.

In S20482, a configuration instruction is generated according to the pico-base station configuration model object and the pico-base station configuration model sub-object which are determined according to the command code and corresponding to the request message, and the configuration instruction is sent to the pico-base station configuration model object and the pico-base station configuration model sub-object; the configuration instruction includes identification information corresponding to the pico-base station configuration model object and the pico-base station configuration model sub-object, and the identification information is configured for indicating the pico-base station configuration model object and the pico-base station configuration model sub-object.

In an optional embodiment, the identification information corresponding to the pico-base station configuration model object and the pico-base station configuration model sub-object can be (but is not limited to) a transport packet identification code PID and a processor identification code CPU ID of the pico-base station configuration model object and the pico-base station configuration model sub-object; for example, after authentication verification is successfully completed, an authentication module configured for authenticating the command word and the command code of the request message generates a PID and a CPUID of the pico-base station configuration model object and the pico-base station configuration model sub-object according to the parsing result of the require message (including whether the command word is legal or not and whether a corresponding target configuration object can be searched for by the command code), and then the received request message is forwarded to the pico-base station configuration model object and a configuration module for configuring the pico-base station configuration model object.

Optionally, the operation that the request message is verified further includes the following operations.

In S2050, a legality of the parameters of the pico-base station configuration model object and the pico-base station configuration model sub-object and the legality of the correlation between the pico-base station configuration model object and the pico-base station configuration model sub-object are verified, in a case where the command word is determined to be legal based on the comparison result; and the correlation between the pico-base station configuration model object and the pico-base station configuration model sub-object includes a reference relation between the pico-base station configuration model object and a referenced sub-object reference by the pico-base station configuration model object.

Furthermore, in an optional embodiment, the operation that a thread corresponding to the request message in a sqlite database is called to execute warehousing processing on the parameters of the pico-base station configuration model object and the pico-base station configuration model sub-object includes the following operations.

In S2062, a target thread is determined according to the request message.

For example, if the request message requests to perform operations such as insert, update, delete and alter, the target thread is determined to be a write thread, and if the request message requests to perform operations such as select and display based on a query format, the target thread is determined to be a read thread.

In S2064, the target threads are arranged, and warehousing operation of the target threads is executed in sequence.

The target threads are arranged in order to avoid the problem of concurrent conflict caused by simultaneous operation of a plurality of processes. For example, when a plurality of request messages are received, target threads corresponding to the request messages can be arranged according to a preset rule, the preset rule can be that the target threads corresponding to the request messages are arranged according to a time sequence of receiving the request messages, or the target threads corresponding to the request messages can be arranged according to weighted proportion of the types of the request messages according to the types of the request messages as long as the target threads can be arranged In S2066, after the warehousing operation is completed, a feedback message is sent.

By monitoring the feedback message, whether the warehousing operation is completed or not can be determined, so that the warehousing process is conveniently tracked.

In an optional embodiment, the warehousing operation of the target threads is carried out in sequence further includes the following operations.

In S2068, a data warehousing process and a data transmission process are stored.

The data warehousing process and the data transmission process are stored refer to that the processes of the sqlite database and other modules are all stored in a storage device taking flash as a permanent storage carrier.

Due to the fact that the amount of data received by the pico-base station is large, under the condition that the total space is fixed, if the size of the permanent storage carrier is too large, the operation space of other modules can be affected. At present, some pico-base stations use RDBMS such as MySQL as a storage carrier of configuration data as pico stations, and the storage mode not only occupies very large storage space and memory space (usually more than 2G), but also is not suitable for equipment such as the pico-base station. The flash is adopted as a permanent storage carrier (usually only hundreds of megabits to 1G), so that the occupied storage space and memory space can be reduced, which is suitable for the pico-base station.

By storing data storage process and data transmission process, data storage process and data transmission process can be analyzed, thereby facilitating optimization of data warehousing process and data transmission process.

In an optional embodiment, the operation that configuration validation processing is carried out on target data includes the following operations.

In S2082, a configuration validation message is sent according to the feedback message, and meanwhile a foreground interface is called.

In S2084, an interface corresponding to the foreground interface is adapted according to the configuration validation message, and a configuration completion signal is sent under the condition that interface adaptation is completed.

In S2086, configuration completion information is prompted according to the configuration completion signal.

According to the description of the foregoing implementation modes, the skilled in the art can clearly understand that the method in the abovementioned embodiments may be implemented by software and a necessary universal hardware platform or by hardware, although in many cases the former is a better implementation mode. Based on such an understanding, the technical solutions of the disclosure substantially or parts making contributions to the conventional art may be embodied in form of software product, and the computer software product is stored in a storage medium (such as a ROM/RAM, a magnetic disk or an optical disk), including a plurality of instructions configured to enable a terminal device (which may be a mobile phone, a computer, a server, a network device or the like) to execute the method in each embodiment of the disclosure.

The embodiments also provide a pico-base station data configuration apparatus. The apparatus is configured to implement the abovementioned embodiments and optional implementation modes, and those that have been described will not be elaborated. As used below, the term "module" may be a combination of software and/or hardware that implements a predetermined function. Although the apparatus described in the embodiments below is preferably implemented in software, implementations in hardware, or a combination of software and hardware, are also possible and contemplated.

Figure 3:
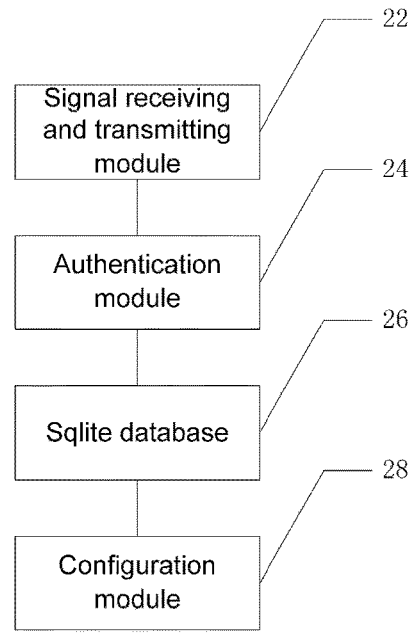
FIG. 3 is structure block diagram of a pico-base station configuration apparatus according to an embodiment of the disclosure.

FIG. 3 is structure block diagram of a pico-base station configuration apparatus according to an embodiment of the disclosure. As shown in FIG. 3, the apparatus includes a signal receiving and transmitting module 22, an authentication module 24, a sqlite database module 26 and a configuration model 28.

The signal receiving and transmitting module 22 is configured to acquire a request message for requesting data configuration of a pico-base station, wherein the request message includes parameters of a pico-base station configuration model object and a pico-base station configuration model sub-object to be connected with the pico-base station.

The authentication module 24 is configured to verify the request message.

The authentication module 24, as an authentication center of the pico-base station, is mainly responsible for authentication processing of user authority and user operation, is responsible for identifying the legality of user identity and the legality of user operation, and ensures that the pico-base station provides reliable and safe functions for a user; for example, when a user logs in for the first time, the authentication module verifies the legality of user identity according to identity information such as a user name and a password input by the user, and allows the user to log in only after the verification is successfully completed.

The sqlite database module 26 is configured to, call a thread corresponding to the request message in the sqlite database to execute warehousing processing on the parameters of the pico-base station configuration model object and the pico-base station configuration model sub-object, in a case where the request message passes the verification.

In an optional embodiment, the sqlite database module 26 includes a read thread, a write thread, a sqlite operation queue, a sqlite interface adaptation layer and a sqlite database.

The configuration model 28 is configured to, carry out configuration validation processing on the pico-base station configuration model object and the pico-base station configuration model sub-object, in a case of determining that the warehousing processing is executed successfully.

In an optional embodiment, the configuration module 28 is used as a configuration center of the pico-base station and is responsible for receiving and parsing product configuration data; in an optional embodiment, the configuration module may (but is not limited to) complete verification of the legality of the pico-base station configuration model object and sub-object, product object correlation, etc. through a Man-Machine Interaction (MML) command, or a configuration file based on XML format, as well as configuration object commands and configuration parameters input by the user.

Configuration validation processing includes that the configuration module 28 receives feedback information of the sqlite database, and sends a configuration validation message according to the feedback message, and meanwhile calls a foreground interface.

In an optional embodiment, the configuration module 28, after receiving the request message from the authentication module 24, verifies the object of the target configuration according to the request message, which may (but is not limited to) include the following operations.

After the configuration module 28 receives the request message from the authentication module 24, the configuration module 28 parses a command code from the request message according to all threads and commands registered by the module, and each command has a unique command code.

And after receiving the request message, the command processing thread responsible for the corresponding request message activates the command processing thread, and then the operation proceeds to a command processing link. The command processing thread completes verification of the legality of the parameters and verification of the associated objects according to the configuration object commands and the parameters.

Besides, the apparatus can also includes foreground protocol module 30.

The foreground protocol module 30 is configured to receive the configuration validation message, adapt an interface corresponding to the foreground interface, and send a configuration completion signal under the condition that the adaptation of the interface is completed; wherein an adaptive interface of the foreground protocol module includes LTE protocol modules such as L2, L3 and RRM, and is responsible for receiving a configuration validation message from the configuration module 28 and sending the validation configuration message to a physical object or a logic object such as a corresponding port, a single board and the like, so that the physical object or logic object such as the corresponding port, single board and the like is connected with the pico-base station configuration model object and sub-object.

The authentication module 24 includes a parsing unit 242, a configuration unit 244, and an authentication unit 246.

The parsing unit 242 is configured to parse the request message and determine a command code and a command word of the request message.

The configuration unit 244 is configured to determine a pico-base station configuration model object and a pico-base station configuration model sub-object corresponding to the request message according to the command code.

The authentication unit 246 is configured to compare the command word with an authentication command word loaded in a system starting process, and determine whether the command word is legal or not based on a comparison result.

The configuration module 28 is further configured to, sent a configuration instruction to the pico-base station configuration model object and the pico-base station configuration model sub-object based on the request message to indicate the pico-base station configuration model object and the pico-base station configuration model sub-object to carry out target configuration processing based on the configuration instruction, in a case where the command word of the request message is legal, or, feed back authentication failure information, in a case where the command word of the request message is not legal.

Furthermore, the configuration module 28 includes an instruction configuration unit 282, and a correlation verification unit 284.

The instruction configuration unit 282 is configured to generate a configuration instruction according to the pico-base station configuration model object and the pico-base station configuration model sub-object, and send the configuration instruction to the pico-base station configuration model object and the pico-base station configuration model sub-object; the configuration instruction includes identification information corresponding to the pico-base station configuration model object and the pico-base station configuration model sub-object, and the identification information is configured for indicating the pico-base station configuration model object and the pico-base station configuration model sub-object.

The correlation verification unit 284 is configured to verify legality of the parameters of the pico-base station configuration model object and the pico-base station configuration model sub-object, and a correlation between target configuration targets, in a case where the command word is determined to be legal based on the comparison result.

In an optional embodiment, the signal receiving and transmitting unit 22 includes a data receiving module 222, a background service module 224 and a flow control gateway module 226.

The data receiving module 222 is configured to receive parameters of the pico-base station configuration model object and the pico-base station configuration model sub-object, and an instruction for instructing the pico-base station configuration model object and the pico-base station configuration model sub-object, and send a request message according to the parameters of the pico-base station configuration model object and the pico-base station configuration model sub-object, and a command for instructing the pico-base station configuration model object and the pico-base station configuration model sub-object.

In an optional embodiment, the data receiving module 222 may be configured as a GUI module, wherein the GUI module is responsible for receiving the input of the user configuration data and configuration parameters, and the sending process of the request message. According to the classification of the service, the GUI module includes a plurality of different sub-modules, and the sub-modules respectively contain different commands.

In an optional embodiment, the configuration object command and parameter receiving can be realized by inputting to the GUI module by a user through a keyboard or a data transmission mode according to the service and the parameters of the pico-base station, and the GUI module generates a configuration request and sends the generated configuration request while receiving the configuration object command and the parameters.

It should be noted that, in an actual network application, since the data received by the GUI module may be from devices such as WebLMT, a base station webmaster device, or a handheld portable terminal, the message received by the GUI may include a file in MML, xml format, or other formats.

The background service module 224 is configured to receive the request message, parse the request message, and forward the request message.

In an optional embodiment, after receiving the configuration request issued by the GUI module, the background service module 224 completes parsing of the configuration request based on a protocol according to the protocol between a client and the background service module 224, and extracts the structure and parameters of the configuration request sent by the GUI module, then according to the message structure between the background processes, based on a message format of the communication between background processes, regenerates the request message and sends the request message.

Based on the input of different GUI modules, the processing flow of the background service module 224 to the configuration request further includes parsing the protocol from the GUI module; for example, when a configuration request is sent through a WebLMT (web page terminal), the background service module needs to parse a http message; when a configuration request from a base station webmaster GUI is received, the configuration request in a TR069 format or the configuration request in an MML format needs to be parsed.

The flow control gateway module 226 is configured to receive the request message, determine the data type of the request message, and forward the request message to the authentication module 24 when the request message is the target type data.

In an optional embodiment, the flow control gateway module 226 may be configured as an EMS network management module, and the target type data is configured as a message in an MML format; the flow control gateway module 226 is used as a gateway module of the network element device, mainly provides a gateway selection function when a user configures data and performs daily maintenance operation, and does not perform specific product service flow processing; and the main functions of the flow control network management module 226 are as follows.

When the received message request is a message in an MML format, the message request is forwarded to the authentication module for authentication processing.

Response messages from other modules are received and forwarded to the background service module.

When the received message request is a message in a non-MML format, the request message is monitored and flow control operation is executed.

For example, when the received message is in a non-MML format, the frequency of the message sent by the module sending the message is controlled, so that a message storm caused by that a large number of messages are not processed and occupy an information transmission channel is avoided.

It is to be noted that in another optional embodiment, for configuration operation between a WebLMT and a base station webmaster, consistency of a configuration object and configuration data needs to be achieved through configuration authority control, namely, when the base station webmaster is configured, the configuration authority of a configuration network element is obtained in advance, therefore, the user cannot temporarily perform configuration through a base station near-end maintenance station, and can perform configuration by only releasing the configuration authority in time.

Figure 4:
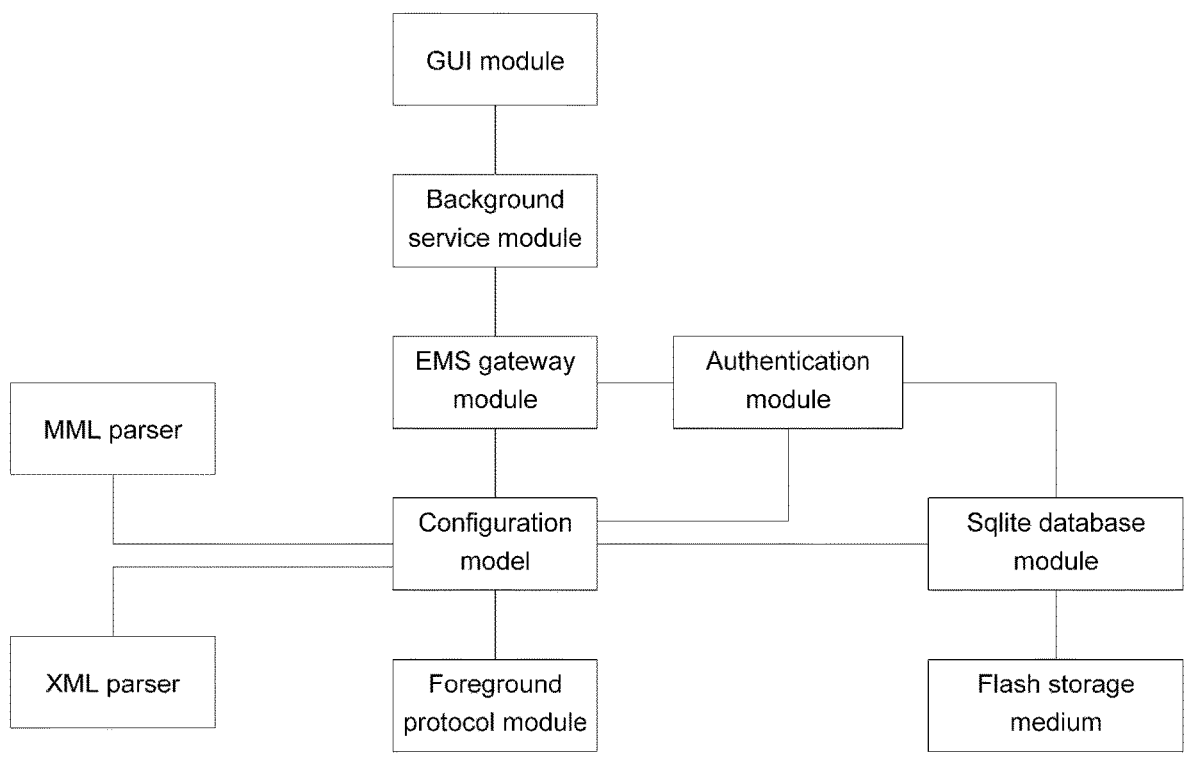
FIG. 4 is a structure block diagram of a work principle of a pico-base station configuration method illustrated in an embodiment of the disclosure.
Figure 5:
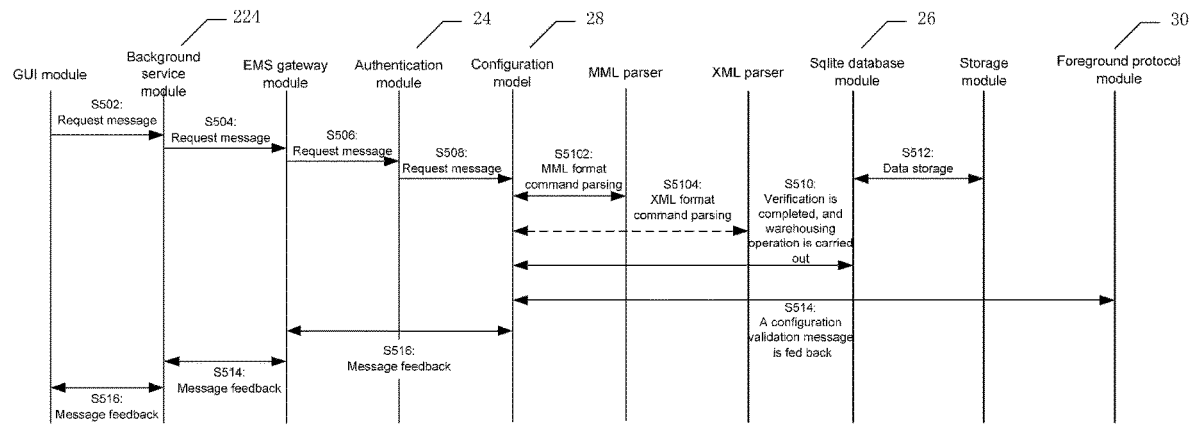
FIG. 5 is a time sequence flowchart of a work principle of a pico-base station configuration method illustrated in an embodiment of the disclosure.

In an optional embodiment, as shown in FIG. 4 and FIG. 5, the working principle of the disclosure is as follows.

The GUI module inputs parameters of the target configuration model object and the sub-object and a configuration command, and then sends a request message containing parameters of the target configuration object and configuration command to the background service module 224 (corresponding to S502 of FIG. 5).

After receiving the request message, the background service module 224 parses information such as a structure, a command code and a command word of the request message, organizes messages among background processes, and reconstructs the request message capable of being recognized by the EMS gateway module based on a message format of communication among the background processes (Corresponding to S504 of FIG. 5).

After receiving the request message from the background service module 224, the EMS gateway module judges the message type of the request message; when the request message is not in the MML type, the request message is directly forwarded to the authentication module for authentication processing, otherwise, flow control processing is performed (corresponding to S506 of FIG. 5).

When receiving the request message of the EMS gateway module, the authentication module 24 judges a target configuration object corresponding to the command code according to the command code of the request message, and judges whether the command word is legal or not according to the command word of the request message; when the command word is judged to be legal, the request message is forwarded to the target configuration object for configuration processing, otherwise, the message of authentication failure is directly returned to the EMS gateway module and returned to the GUI module along the way, and a user is prompted that input is illegal and configuration is finished (corresponding to S508 of FIG. 5); in the process starting process, the authentication module 24 accesses the sqlite database and reads configuration data of the configuration object and sub-object supported by the pico-base station into a memory, the configuration data contains information such as the command code, permission group, command word, configuration parameters and field value range, when a user carries out data configuration on the pico-base station through an operation terminal (WebLMT, a handheld terminal or a webmaster GUI) subsequently, the authentication module carries out verification on contents such as legality of user operation and configuration authority according to a configuration command in the request message and a configuration object loaded into the memory.

After receiving the request message from the authentication module 24, the configuration module 28 verifies the legality of the parameters of the target configuration object and the relevance of the target configuration object under the condition that the command word is determined to be legal based on the comparison result, generates a configuration instruction according to the target configuration object, and sends the configuration instruction to the target configuration object; under the condition that the verification is completed, the configuration module sends a warehousing request to a sqlite database module 26 (corresponding to S510 of FIG. 5); when the configuration module 28 receives a request message of an MML type, an MML parser is called for parsing; when configuration module 28 receives a request message of an XML type, an XML parser is called for parsing (corresponding to S5102 and S5104 of FIG. 5).

After the sqlite database module 26 receives the warehousing request, corresponding thread is invoked for warehousing processing according to planning of the sqlite database module 26, and after warehousing operation of the sqlite database is completed, feedback message is sent to configuration module 28, and all product processes of the sqlite database and background are stored in a storage unit with flash as a permanent storage carrier (corresponding to S512 of FIG. 5.)

The configuration module 28 sends a configuration validation request to the foreground protocol module 30 after receiving the feedback message, and calls the foreground interface; the foreground protocol module 30 adapts an interface after receiving the configuration validation request and feeds back an adaptation result to the configuration module 28, the configuration module 28 organizes an MML message and returns the MML message to the EMS gateway module, the EMS gateway module returns the MML message to the GUI module, and the configuration is finished (corresponding to S514 and S516 of FIG. 5).

Figure 6:
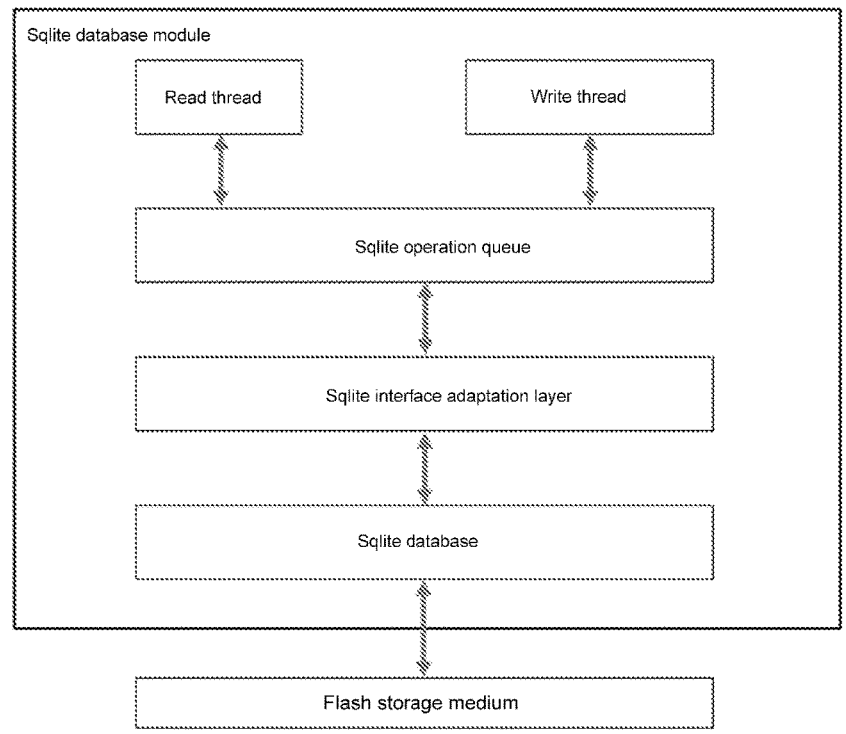
FIG. 6 is a structure block diagram of a work principle of a sqlite database module illustrated in an embodiment of the disclosure.

As shown in FIG. 6, after the sqlite database module 26 receives the warehousing request, the sqlite database module 26 sends the warehousing request to a read thread or a write thread of the sqlite database module 26, then the read thread and the write thread corresponding to the warehousing request of the sqlite database module 26 join a sqlite operation queue, then the warehousing request is sent to a sqlite database through an sqlite interface adaptation layer, the parameters of the target configuration object are written into a db file through the sqlite database, and the process is stored in a flash storage medium.

The embodiments of the disclosure further provide a non-transitory computer-readable storage medium. The storage medium stores a computer program. The computer program is configured to perform the steps in any one of the abovementioned method embodiments when running by a processor.

In an optional embodiment, the abovementioned storage medium may include, but is not limited to, various media capable of storing a computer program, such as a USB flash disk, a Read-Only Memory (ROM), a Random Access Memory (disk), a mobile hard disk, a magnetic disk or an optical disc.

The embodiments of the disclosure further provide an electronic apparatus, which includes a memory and a processor. The memory stores a device program, and the processor is configured to run the computer program to perform any one of the abovementioned method embodiments.

In an exemplary embodiment, the abovementioned electronic apparatus may further include a transmission device and an input/output device. The transmission device is connected to the abovementioned processor. The input/output device is connected to the abovementioned processor.

A specific example in the embodiment may refer to the examples described in the above embodiments and exemplary implementation modes, and details are not described herein in the embodiment.

It is apparent that the skilled in the art should understand that various modules or steps mentioned above in the disclosure may be implemented by using a general calculation apparatus, may be centralized on a single calculation apparatus or may be distributed on a network composed of a plurality of calculation apparatuses. They may be implemented by using executable program codes of the calculation apparatuses. Thus, they may be stored in a storage apparatus and executed by the calculation apparatuses, the shown or described steps may be executed in a sequence different from this sequence under certain conditions, or they are manufactured into each integrated circuit module respectively, or a plurality of modules or steps therein are manufactured into a single integrated circuit module. Therefore, this application is not limited to any specific hardware and software combination.

The above is only preferred embodiments of the disclosure and is not intended to limit the disclosure. Those skilled in the art may make various modifications and variations. Any modifications, equivalent replacements, improvements and the like made within the principle of the disclosure shall fall within the scope of protection of the disclosure.

What is claimed is:

1. A pico-base station configuration method, comprising
acquiring a request message for requesting data configuration of a pico-base station, wherein the request message comprises parameters of a pico-base station configuration model object and a pico-base station configuration model sub-object;
verifying the request message;
calling a thread corresponding to the request message in a sqlite database to execute warehousing processing on the parameters of the pico-base station configuration model object and the pico-base station configuration model sub-object, in a case where the request message passes the verification; and
carrying out configuration validation processing on the pico-base station configuration model object and the pico-base station configuration model sub-object, in a case of determining that the warehousing processing is executed successfully;
wherein verifying the request message comprises: parsing the request message, and determining a command word of the request message; comparing the command word with an authentication command word loaded in a system starting process, and judging whether the command word is legal or not based on a comparison result;
wherein the method further comprises: parsing the request message, determining a command code of the request message, and determining the pico-base station configuration model object and the pico-base station configuration model sub-object corresponding to the request message according to the command code; after judging whether the command word of the request message is legal or not based on the comparison result, the method further comprises: sending a configuration instruction to the pico-base station configuration model object and the pico-base station configuration model sub-object based on the request message to indicate the pico-base station configuration model object and the pico-base station configuration model sub-object to carry out target configuration processing based on the configuration instruction, in a case where the command word of the request message is legal; and, feeding back authentication failure information, in a case where the command word of the request message is not legal.

2. The method according to claim 1, wherein sending the configuration instruction to the pico-base station configuration model object and the pico-base station configuration model sub-object based on the request message to indicate the pico-base station configuration model object and the pico-base station configuration model sub-object to carry out target configuration processing based on the configuration instruction comprises:

generating a configuration instruction according to the pico-base station configuration model object and the pico-base station configuration model sub-object corresponding to the request message, which are determined according to the command code, and sending the configuration instruction to the pico-base station configuration model object and the pico-base station configuration model sub-object; wherein the configuration instruction comprises identification information corresponding to the pico-base station configuration model object and the pico-base station configuration model sub-object, and the identification information is configured for indicating the pico-base station configuration model object and the pico-base station configuration model sub-object.

3. The method of claim 1, wherein verifying the request message comprises:

verifying legality of the parameters of the pico-base station configuration model object and the pico-base station configuration model sub-object and legality of a correlation between the pico-base station configuration model object and the pico-base station configuration model sub-object, in a case where the command word is determined to be legal based on the comparison result; wherein the correlation between the pico-base station configuration model object and the pico-base station configuration model sub-object comprises a reference relation between the pico-base station configuration model object and a referenced sub-object reference by the pico-base station configuration model object.

4. A pico-base station configuration apparatus, comprising a signal receiving and transmitting module, configured to acquire a request message for requesting data configuration of a pico-base station, wherein the request message comprises parameters of a pico-base station configuration model object and a pico-base station configuration model sub-object to be connected with the pico-base station;

an authentication module, configured to verify the request message;

a sqlite database, configured to, call a thread corresponding to the request message in the sqlite database to execute warehousing processing on the parameters of the pico-base station configuration model object and the pico-base station configuration model sub-object, in a case where the request message passes the verification; and;

a configuration model, configured to, carry out configuration validation processing on the pico-base station configuration model object and the pico-base station configuration model sub-object, in a case of determining that the warehousing processing is executed successfully;

wherein the authentication module comprises: a parsing unit, configured to parse the request message and determine a command code and a command word of the request message; an authentication unit, configured to compare the command word with an authentication command word loaded in a system starting process, and determine whether the command word is legal or not based on a comparison result;

wherein the apparatus further comprises: a configuration unit, configured to determine the pico-base station configuration model object and the pico-base station configuration model sub-object corresponding to the request message according to the command code; the configuration module is configured to, sent a configuration instruction to the pico-base station configuration model object based on the request message to indicate the pico-base station configuration model object to carry out target configuration processing based on the configuration instruction, in a case where the command word of the request message is legal; or feed back authentication failure information in a case where the command word of the request message is not legal.

5. A non-transitory computer-readable storage medium, comprising a stored program, wherein the program is configured to perform the method according to claim 1 when running by a processor.

6. An electronic apparatus, comprising a memory and a processor, wherein the memory stores a program, and the processor is configured to run the program to perform the method according to claim 1.

7. The method according to claim 1, wherein carrying out configuration validation processing on the pico-base station configuration model object and the pico-base station configuration model sub-object, in a case of determining that the warehousing processing is executed successfully comprises:

carrying out interface adaptation on the pico-base station configuration model object and the pico-base station configuration model sub-object according to a message fed back by the sqlite database, in a case where all thread operations corresponding to the request message are completed.

8. The method according to claim 1, wherein judging whether the command word is legal or not based on a comparison result comprises:

determining that the command word is legal in a case where the command word is the same as the authentication command word, and otherwise, determining that the command word is not legal.

9. The method according to claim 3, wherein after verifying the legality of the parameters of the pico-base station configuration model object and the pico-base station configuration model sub-object and the legality of the correlation between the pico-base station configuration model object and the pico-base station configuration model sub-object, the method further comprises:

converting the parameters of the pico-base station configuration model object and the pico-base station configuration model sub-object into statements with corresponding formats, and sending converted parameters to the sqlite database.

10. The method according to claim 2, wherein the identification information corresponding to the pico-base station configuration model object and the pico-base station configuration model sub-object comprises:

a transport packet identification code (PID) and a processor identification code (CPUID) of the pico-base station configuration model object and the pico-base station configuration model sub-object.

11. The method according to claim 1, wherein calling a thread corresponding to the request message in a sqlite database to execute warehousing processing on the parameters of the pico-base station configuration model object and the pico-base station configuration model sub-object comprises:

determining target threads according to the request message;

arranging the target threads, and executing warehousing operation of the target threads in sequence;

sending a feedback message after the warehousing operation is completed;

storing a data warehousing process and a data transmission process.

12. The method according to claim 4, wherein the configuration module comprises:

a instruction configuration unit, configured to generate a configuration instruction according to the pico-base station configuration model object and the pico-base station configuration model sub-object corresponding to the request message, which are determined according to the command code, and send the configuration instruction to the pico-base station configuration model object and the pico-base station configuration model sub-object; wherein the configuration instruction comprises identification information corresponding to the pico-base station configuration model object and the pico-base station configuration model sub-object, and the identification information is configured for indicating the pico-base station configuration model object and the pico-base station configuration model sub-object.

13. The method according to claim 4, wherein the authentication module comprises:

a correlation verification unit, configured to verify legality of the parameters of the pico-base station configuration model object and the pico-base station configuration model sub-object and legality of a correlation between the pico-base station configuration model object and the pico-base station configuration model sub-object, in a case where the command word is determined to be legal based on the comparison result; wherein the correlation between the pico-base station configuration model object and the pico-base station configuration model sub-object comprises a reference relation between the pico-base station configuration model object and a referenced sub-object.

14. The method according to claim 4, wherein the configuration model is further configured to:

carry out interface adaptation on the pico-base station configuration model object and the pico-base station configuration model sub-object according to a message fed back by the sqlite database, in a case where all thread operations corresponding to the request message are completed.

\* \* \* \* \*